(12) United States Patent
Pinault et al.

(10) Patent No.: US 12,168,278 B2
(45) Date of Patent: Dec. 17, 2024

(54) BLOCKING DEVICE FOR A SEMI-FINISHED OPTICAL ELEMENT

(71) Applicant: ESSILOR INTERNATIONAL, Charenton-le-Pont (FR)

(72) Inventors: Sébastien Pinault, Charenton le Pont (FR); Luc Martin, Charenton le Pont (FR); Jérôme Moine, Charenton le Pont (FR); Xavier Bultez, Charenton le Pont (FR)

(73) Assignee: Essilor International, Charenton-le-pont (FR)

( * ) Notice: Subject to any disclaimer, the term of this patent is extended or adjusted under 35 U.S.C. 154(b) by 1421 days.

(21) Appl. No.: 16/608,955

(22) PCT Filed: Jun. 12, 2018

(86) PCT No.: PCT/EP2018/065441
§ 371 (c)(1),
(2) Date: Oct. 28, 2019

(87) PCT Pub. No.: WO2018/229026
PCT Pub. Date: Dec. 20, 2018

(65) Prior Publication Data
US 2020/0180100 A1   Jun. 11, 2020

(30) Foreign Application Priority Data

Jun. 12, 2017  (EP) .................................... 17305709

(51) Int. Cl.
*B24B 13/005* (2006.01)
*B24B 9/14* (2006.01)
(Continued)

(52) U.S. Cl.
CPC ............ *B24B 13/005* (2013.01); *B24B 9/146* (2013.01); *B24B 13/0052* (2013.01);
(Continued)

(58) Field of Classification Search
CPC ... B24B 13/00; B24B 13/005; B24B 13/0057; B24B 13/0052; B24B 13/012;
(Continued)

(56) References Cited

U.S. PATENT DOCUMENTS 2,582,087 A    1/1952 Turner et al.
5,421,771 A *  6/1995 Wardle .................. B24B 13/005
                                                         451/384
(Continued)

FOREIGN PATENT DOCUMENTS

EP    2011604 A1   1/2009
EP    2319660 A1   5/2011
(Continued)

OTHER PUBLICATIONS

FR2654027A1 English translation (Year: 1991).*
(Continued)

*Primary Examiner* — Makena S Markman
(74) *Attorney, Agent, or Firm* — NIXON & VANDERHYE (57)  ABSTRACT

The blocking device includes a blocking portion configured for blocking the semi-finished optical element and including a support member configured for providing a rigid support to the semi-finished optical element, the support member including a support element made of a shape-memory material having a rigid state below a predetermined temperature and a plastic state above the predetermined temperature, the support element assuming in the absence of external forces a predetermined memory shape when heated above the predetermined temperature, the support member having a contact face onto which the first face of the semi-finished optical element is to be applied; saind blocking portion including at least one of a heating device configured for heating the support element above the predetermined tem-
(Continued)

perature and a cooling device configured for cooling the support element below the predetermined temperature.

19 Claims, 4 Drawing Sheets

(51) Int. Cl.
  *B24B 13/01*  (2006.01)
  *B24B 41/06*  (2012.01)
  *B29D 11/00*  (2006.01)
(52) U.S. Cl.
  CPC .......... *B24B 13/012* (2013.01); *B24B 41/061* (2013.01); *B29D 11/0048* (2013.01)
(58) Field of Classification Search
  CPC ... B24B 9/146; B24B 49/14; B29D 11/00942; B29D 11/0048
  See application file for complete search history.

(56) References Cited

U.S. PATENT DOCUMENTS

| | | | |
|---|---|---|---|
| 5,695,393 A * | 12/1997 | Granziera | B24B 13/012 451/384 |
| 6,126,528 A * | 10/2000 | Sedlock | B24B 13/0057 451/384 |
| 6,827,325 B2 * | 12/2004 | Hofmann | B29C 61/0608 425/808 |
| 6,863,602 B2 * | 3/2005 | Incera | B24B 13/0052 451/384 |
| 6,986,855 B1 * | 1/2006 | Hood | B29C 33/44 264/219 |
| 7,761,974 B2 * | 7/2010 | Browne | B23Q 3/086 29/559 |
| 7,891,075 B2 * | 2/2011 | Mankame | B23Q 3/086 148/563 |
| 8,177,607 B2 * | 5/2012 | Herbin | B25B 11/007 451/384 |
| 2002/0061717 A1 | 5/2002 | Goulet et al. | |
| 2002/0182984 A1 * | 12/2002 | Dooley | B24B 13/012 451/42 |
| 2015/0306722 A1 | 10/2015 | Felten | |

FOREIGN PATENT DOCUMENTS

| | | | |
|---|---|---|---|
| EP | 2498950 A1 | 9/2012 | |
| FR | 2654027 A1 * | 5/1991 | |
| JP | 2002-192447 A | 7/2002 | |
| JP | 2003-071691 A | 3/2003 | |
| JP | 2010-137316 A | 6/2010 | |
| JP | 2013-180373 A | 9/2013 | |
| WO | 98/41359 A1 | 9/1998 | |
| WO | 2011/054665 A1 | 5/2011 | |
| WO | WO-2012078969 A1 * | 6/2012 | ........... B24B 13/005 |

OTHER PUBLICATIONS

John A. Hiltz, Shape Memory Polymers Literature Review, Aug. 2002, Defence R&D Canada Atlantic Technical Memorandum 2002-127 (Year: 2002).*

International Search Report, dated Oct. 2, 2018, from corresponding PCT application No. PCT/EP2018/065441.

* cited by examiner

BLOCKING DEVICE FOR A SEMI-FINISHED OPTICAL ELEMENT

FIELD OF THE INVENTION

The invention relates to the blocking of semi-finished optical elements.

BACKGROUND ART

It is known that a semi-finished optical element, for instance a semi-finished ophthalmic lens, has a finished face and opposite to the finished face an unfinished face which is to be surfaced so as to obtain an optical element having the desired optical properties.

It is also known to surface the unfinished face with a machine, sometimes called a generator, configured for holding the semi-finished optical element via a blocking device previously attached to the finished face of the semi-finished optical element.

Japanese patent application JP 2013-180373 discloses a lens holder having a fixture, a holding element that is provided to hold a lens through a bounding member. The holding element has shape memory property, and maintains a shape in conformity with a shape of an optical surface of the lens in a predetermined condition. A self-deformation of the holding element is carried out in case of another predetermined condition into a shape which weakens the retention strength with respect to the lens. The self-deformation is carried out for deblocking the lens after the processing is finished. The self-deformation process also provides a shape restoration of the holding element before reusing it. For fixing the lens on the holding element, a UV curable resin 4a is applied on the holding member. The holding element is then heated so as to become conformable and the lens is pressed against the holding element to conform it to the lens. The UV curable resin is then cured for becoming the bounding member and then the assembly is cooled.

The invention is directed to a blocking device for blocking a semi-finished optical element, which is improved and optimized and which is further convenient, simple, economic and easy to manufacture.

SUMMARY OF THE INVENTION

The invention accordingly provides a blocking device for blocking a semi-finished optical element having a first face to which the blocking device is to be attached and having opposite to the first face a second face to be surfaced in a surfacing machine configured for holding the semi-finished optical element via the blocking device, said blocking device comprising:
  a mounting portion provided for mounting the blocking device on a corresponding mounting member of said surfacing machine; and
  a blocking portion configured for blocking said semi-finished optical element;
  said blocking portion comprising a support member configured for providing a rigid support to said semi-finished optical element, said support member includes a support element made of a shape-memory material having a rigid state below a predetermined temperature and a plastic state above said predetermined temperature, said support element assuming in the absence of external forces a predetermined memory shape when heated above said predetermined temperature, said support member having a contact face onto which said first face of said semi-finished optical element is to be applied;
  characterized in that said blocking portion includes at least one of (i) a heating device configured for heating said support element above said predetermined temperature and (ii) a cooling device configured for cooling said support element below said predetermined temperature.

The invention is based on the observation that it is possible, in particular by implementing the advantageous features disclosed hereinafter, to have a cooling device and/or a heating device embedded in the blocking device.

The cooling device and/or heating device can then be located as close as possible to the support element and perform an efficient heating and/or cooling of the latter.

The blocking device is further very compact.

The blocking device according to the invention is thus convenient, simple, economic and easy to manufacture.

According to features preferred as being very simple, convenient and economical for embodying the blocking device according to the invention:
  said heating device and/or said cooling device comprises a Peltier effect cell;
  said blocking device comprises a body forming said mounting portion, said support element projecting from said body; said Peltier effect cell is integrated into a portion of said body located at a side of the support element opposite to said contact face;
  said shape-memory material comprises ferromagnetic elements such that said support element is configured for being inductively heated above said predetermined temperature;
  said ferromagnetic elements are in the form of a powder dispersed into said material;
  said ferromagnetic elements represent a volume ratio between 10 and 40%;
  said predetermined temperature is between 10 and 50° C.;
  said material has a Young modulus in traction between 5 and 100 MPa below said predetermined temperature, and between 0.3 and 3 MPa above said predetermined temperature;
  said blocking device includes a blocking member configured for enabling a vacuum-based retaining effect so that said semi-finished optical element is attached to said blocking portion, said contact face of said support member being a surface of said support element;
  said blocking device comprises a pneumatic blocking member defining a cavity configured to be closed by said first face of said semi-finished optical element, said pneumatic blocking member being configured to sustain a vacuum inside said cavity when closed by said first face of said semi-finished optical element so as to enable said vacuum-based retaining effect; and/or
  said contact face of said support member is a surface of said support element and said shape-memory material is configured for having adherence properties with respect to said first face of said semi-finished optical element when said contact face of said support element and said first face of said semi-finished optical element are in direct contact with each other, said adherence properties being sufficient for attaching said first face of said semi-finished optical element to said contact face of said support element so that the semi-finished optical element can be surfaced in the surfacing machine.

The invention further provides an apparatus for attaching in a predetermined relative position a blocking device as described above and a semi-finished optical element having a first face to which the blocking device is to be attached and having opposite to the first face a second face to be surfaced in a surfacing machine configured for holding the semi-finished optical element via the blocking device, said apparatus comprising a positioning system configured to determine a current position of said semi-finished optical element with respect to a reference frame of said apparatus, and configured for positioning said semi-finished optical element with respect to said reference frame into said predetermined relative position.

According to features preferred as being very simple, convenient and economical for embodying the apparatus according to the invention, said apparatus comprises a heating device configured for heating said support element of said blocking device above said predetermined temperature, said heating device comprises an electromagnetic coil and said shape-memory material of said support element of said blocking device comprises ferromagnetic elements such that said support element is configured for being inductively heated by said electromagnetic coil above said predetermined temperature.

The invention further relates to a method for attaching in a predetermined relative position a blocking device as described above and a semi-finished optical element having a first face to which the blocking device is to be attached and having opposite to the first face a second face to be surfaced in a surfacing machine configured for holding the semi-finished optical element via the blocking device, said method comprising the steps of:

providing said blocking device in an initial state in which said material of said support element is in said rigid state and said support element assumes said memory shape;

then heating said support element above said predetermined temperature so that said material reaches said plastic state;

then bringing said first face of said semi-finished optical element into contact with said contact face of said support element and pushing said semi-finished optical element against said contact face to conform said support element until said contact face replicates the shape of the portion of said first face which is in contact with said contact face and said semi-finished optical element is in said predetermined relative position with respect to said blocking device; and then cooling said support element below said predetermined temperature so that said material reaches said rigid state.

According to further features of the method according to the invention:

for reaching said plastic state of said material said support element is heated at a temperature of about 55° C., and for reaching said rigid state of said material said support element is cooled at a temperature of about 20° C.

BRIEF DESCRIPTION OF THE DRAWINGS

The description of the invention now continues with a detailed description of a preferred embodiment given hereinafter by way of non-limiting example and with reference to the appended drawings. In these drawings.

DETAILED DESCRIPTION OF PREFERED EMBODIMENTS

Figure 1:
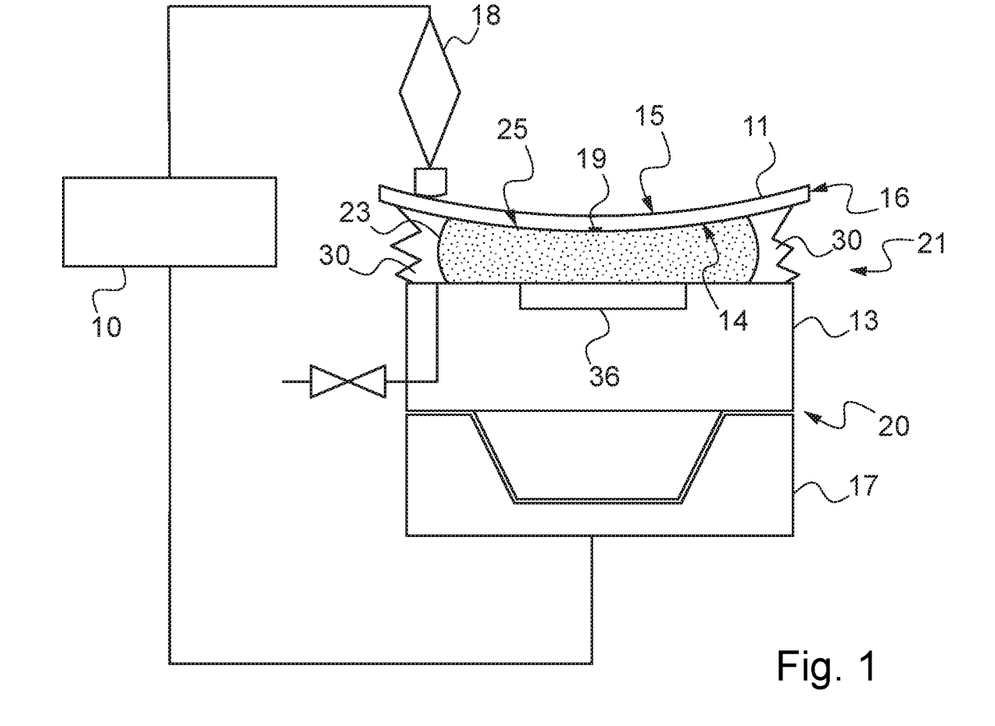
FIG. 1 is a schematic cross-section view of a surfacing machine provided with a blocking device according to the invention and a surfacing tool, a semi-finished optical element having a first face attached to the blocking device and a second face cooperating with the surfacing tool.

FIG. 1 shows a surfacing machine 10, a blocking device 13 fitted to the surfacing machine 10 and a semi-finished optical element 11 coupled to the blocking device 13 and being processed in the surfacing machine 10.

The surfacing machine 10 is configured for holding the semi-finished optical element 11 via the blocking device 13.

The semi-finished optical element 11 is here a semi-finished ophthalmic lens and has a first optical face 14, a second optical face 15, opposite to the first optical face 14, and a lateral face 16 extending from one to the other of the first optical face 14 and second optical face 15.

The semi-finished optical element is here made of polycarbonate.

The semi-finished optical element 11 is generally circular in shape, the first face 14 is convex and the second face 15 is concave.

The blocking device 13 is here directly attached to the first optical face 14 of the semi-finished optical element 11.

The second face 15 is to be surfaced in the surfacing machine 10.

The semi-finished optical element 11 is provided with at least one reference mark 19, which is printed with ink or engraved on an optical face of the optical element 11, here the first face 14, and is configured to be detected by a positioning system of an apparatus configured to determine a current position of the optical element 11 with respect to a reference frame of the apparatus. This is referred to in more details below.

The surfacing machine 10 comprises a holder 17 configured for holding the blocking device 13 in a predetermined position and a displaceable surfacing tool 18 configured for surfacing the second face 15.

The holder 17 is configured for driving the blocking device 13 in a spinning movement, while the surfacing tool 18 travels over the second face 15.

The semi-finished optical element 11 and the blocking device 13 are attached in a predetermined relative position.

In particular, the position of the optical element 11 with respect to the blocking device 13 is such that the optical element 11 and the blocking device 13 rotate coaxially.

As is well known, the second face 15 is surfaced in the surfacing machine 10 for adjusting the optical properties of the element 11, here for adjusting the ophthalmic properties of the ophthalmic lens to the prescription of the user.

Figure 3:
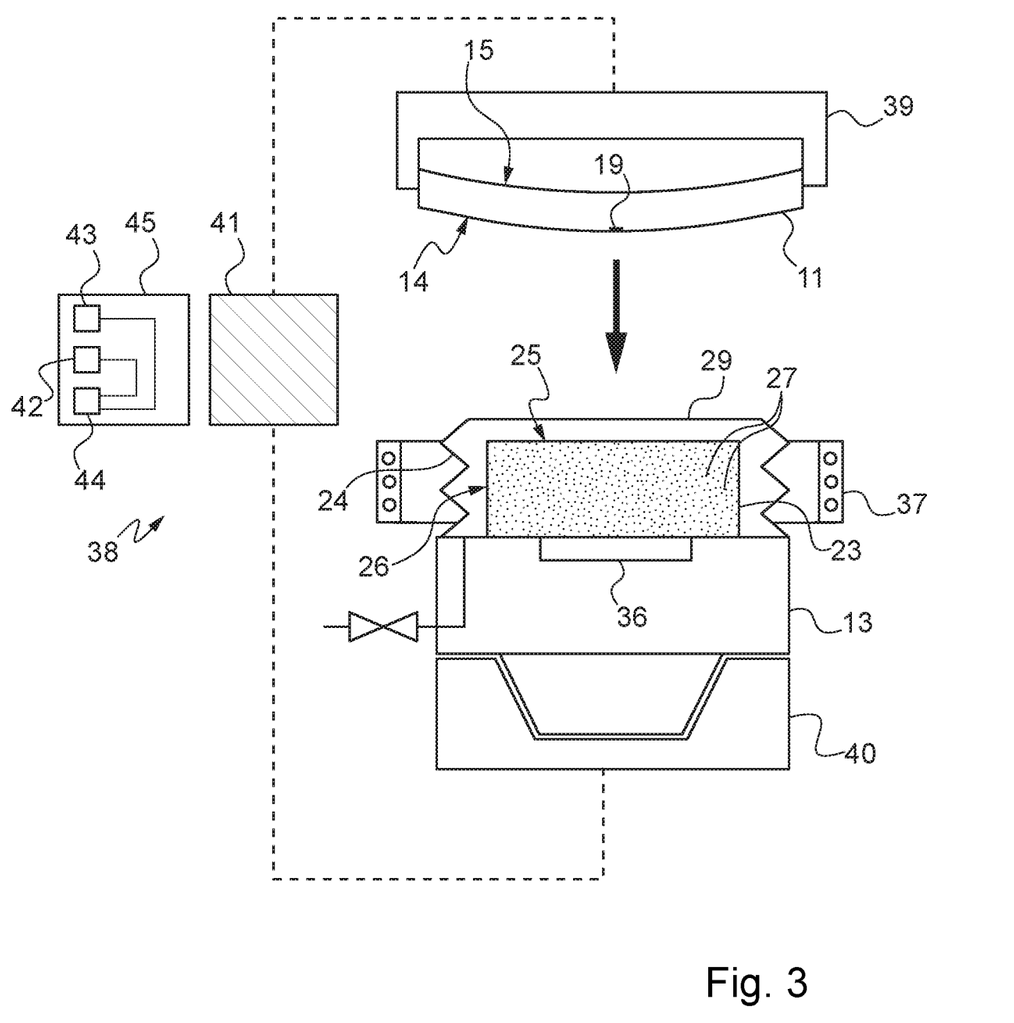
FIG. 3 schematically illustrates in cross-section the semi-finished optical element and the blocking device each mounted in an attaching apparatus configured to bring the semi-finished optical element until a predetermined relative position with respect to the blocking device.
Figure 4:
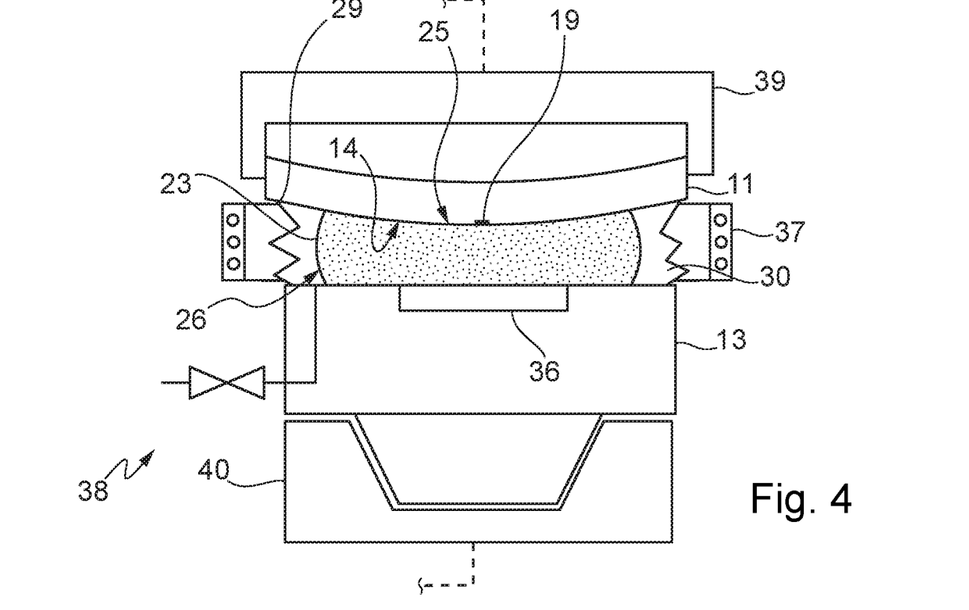
FIG. 4 is a partial view similar to FIG. 3, the semi-finished optical element being in the predetermined relative position with respect to the blocking device.
Figure 5:
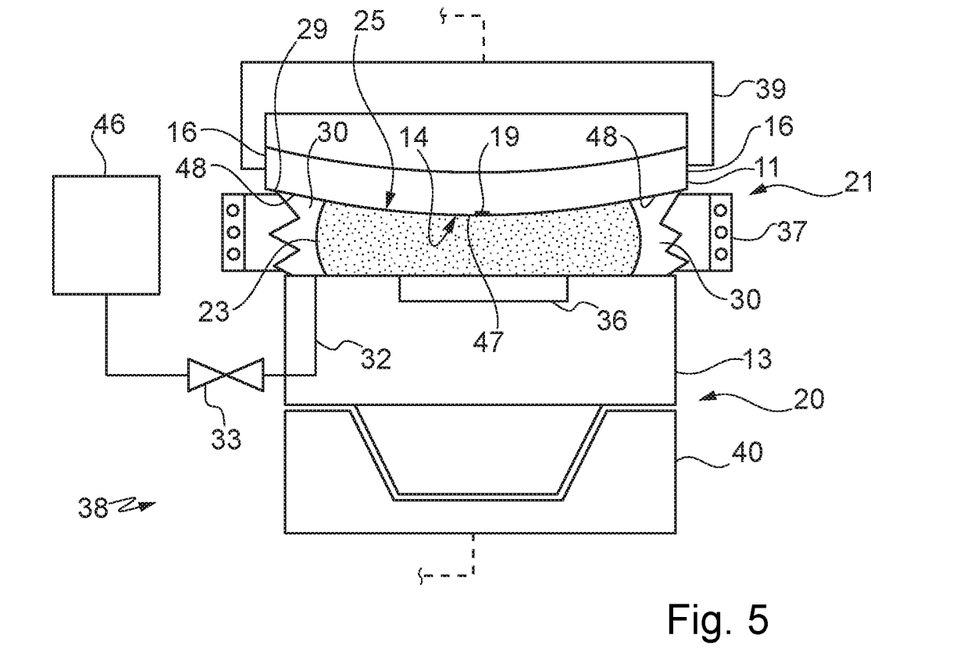
FIG. 5 is a view similar to FIG. 4, but with the blocking device connected to a vacuum pulling device of the attaching apparatus.

It will be noted that the ablating of material resulting from the surfacing operation is schematically visible on FIG. 1 where the semi-finished optical element 11 has a reduced thickness compared to its thickness on FIGS. 3 to 5, where the optical element 11 has not yet been processed.

The blocking device 13 is here configured for pneumatically blocking the semi-finished optical element 11, and is more specifically a vacuum blocking device.

The blocking device 13 comprises a mounting portion 20 and a blocking portion 21, opposite to the mounting portion 20.

The mounting portion 20 is provided for mounting the blocking device 13 on a corresponding mounting member of the surfacing machine 10, here formed by the holder 17.

The mounting portion 20 is here configured such that the blocking device 13 is removable from the mounting member of the surfacing machine 10.

In a non-illustrated variant, the blocking device is integrated to the surfacing machine.

The blocking portion 21 is configured for blocking the semi-finished optical element 11 and comprises a support member configured for providing a rigid support to the semi-finished optical element 11 during the surfacing operation.

The support is sufficiently rigid to carry out the surfacing operation. In particular the support is sufficiently rigid to prevent the semi-finished optical element 11 from excessive vibrations during the surfacing operation.

Figure 2:
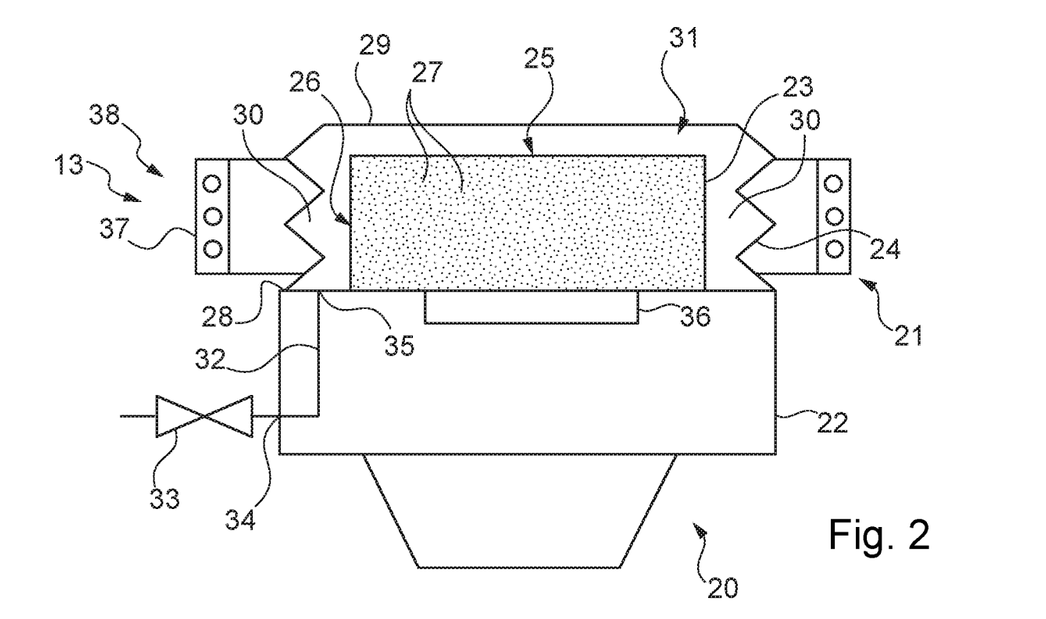
FIG. 2 illustrates in cross-section the blocking device cooperating with a heating device configured for heating a support element of the blocking device, the blocking device being in an initial state where the support element assumes a predetermined memory shape.

The blocking device 13 will now be described in more details with reference to FIG. 2, where it is shown in an initial state, previous to its coupling to the semi-finished optical element 11.

The blocking device 13 is generally cylindrical in shape.

The blocking device 13 comprises a body 22, a support element 23 projecting from the body 22, and a resiliently deformable tubular wall 24 attached to the body 22 and extending around the support element 23.

The support element 23 and the body 22 are each generally cylindrical in shape and coaxially arranged with respect to each other.

The body 22 is made of a rigid material and forms, at least partially, the mounting portion 20 of the blocking device 13.

The support element 23 forms the support member of the blocking portion 21.

The support element 23 is here distinct from the body 22 and is secured to the latter.

The support element 23 is here made of a single piece.

The support element 23 has a transversal surface 25 which is situated opposite to the body 22, and a lateral surface 26 extending from the transversal surface 25 to the body 22.

The transversal surface 25 is configured to be in contact with the first optical face 14 of the optical element 11.

The transversal surface 25 therefore forms a contact face of the support member onto which the first optical face 14 is to be applied during the attachment process of the blocking device 13 to the optical element 11.

The lateral surface 26 is here at a distance from the tubular wall 24. More generally the lateral surface 26 is free.

The support element 23 is made of a shape-memory material, comprising here a shape-memory polymer.

This shape-memory material has a rigid state below a predetermined temperature and a plastic state above the predetermined temperature.

Due to the shape-memory properties of the material, the support element 23 assumes in the absence of external forces a predetermined memory shape when heated above the predetermined temperature.

In other words, when the material is in the plastic state, the support element 23 has a natural tendency to recover his predetermined memory shape after being deformed.

The predetermined temperature is here the glass transition temperature of the material, which is about 35° C.

More generally, the predetermined temperature is between 10 and 50° C.

Below the predetermined temperature (in the rigid state) the material has here a Young modulus in traction of about 50 MPa. Above the predetermined temperature (in the plastic state) the material has here a Young modulus in traction of about 1.5 MPa.

More generally, the material has a Young modulus in traction between 5 and 100 MPa below the predetermined temperature, and between 0.3 and 3 MPa above the predetermined temperature.

For reaching the initial state of the blocking device 13 illustrated on FIG. 2, the support element 23 has been heated above the predetermined temperature while not being subjected to any external force, and then cooled below the predetermined temperature. The support element 23 is therefore rigid and assumes its predetermined memory shape.

It will be noted that when the support element 23 assumes its predetermined memory shape, the transversal surface 25 is here substantially planar, that is to say not curved.

The material of the support element 23 here comprises ferromagnetic elements 27 such that the support element 23 is configured to be inductively heated above the predetermined temperature.

The ferromagnetic elements 27 are symbolized on the drawings by dots filling the support element 23.

The ferromagnetic elements 27 are here in the form of a powder dispersed into the material. The ferromagnetic elements 27 are here made of stainless steel.

The ferromagnetic elements 27 here represent a volume ratio of about 30% of the shape-memory material. More generally, the volume ratio is between 10 and 40%.

The tubular wall 24 comprises a bellows gasket having a rear edge 28 fixed to the body 22 and a front edge 29, opposite to the rear edge 28.

The tubular wall 24 is here of a generally cylindrical shape and is axially oriented so that the axial deformation of the tubular wall 24 will bring the front edge 29 closer or farther from the body 22.

The front edge 29 is configured to be in sealing contact with the first optical face 14 of the optical element 11 when the latter is attached to the blocking device 13.

It will be noted here that in the initial state of the blocking device 13, the front edge 29 is axially slightly beyond the transversal surface 25 of the support element 23 on the opposite side to the body 22.

The tubular wall 24 delimits an internal space 31 in which is received, at least partially, the support element 23.

The portion of the internal space 31 extending between the lateral surface 26 of the support element 23 and the tubular wall 24 forms a cavity 30 which extends around the support element 23.

In other words, the tubular wall 24 defines the cavity 30. More precisely, the tubular wall 24 defines an outer side of the cavity 30 while the lateral surface 26 defines an inner side of the cavity 30, opposite to the outer side.

The cavity 30 is here annular.

The blocking device 13 further comprises a duct 32 formed in the body 22 and a valve 33 connected to the duct 32. The duct 32 is connected through a first end 34 to the valve 33 while it opens into the cavity 30 through an opposite end 35 to the first end 34.

The valve 33 is configured for controlling the pressure in the duct 32. The valve 33 is in particular configured for preventing the fluidic circulation through the duct 32, here in both directions.

The blocking device 13 further comprises a first cooling and/or heating device for the support element 23.

The first cooling and/or heating device comprises a Peltier effect cell 36 here located at a side of the support element 23 opposite to its transversal surface 25.

The cell 36 is located in the blocking device 13 and is here more specifically housed in the body 22 of the blocking device 13.

The cell 36 is therefore integrated into the blocking device 13, and more specifically into a portion of the body 22 located at a side of the support element 23 opposite to the transversal surface 25.

The cell 36 can be powered through electrical terminals (not illustrated) which are accessible on the side of the body 22.

The cell 36 is configured for cooling the support element 23 below the predetermined temperature and/or for heating the support element 23 above the predetermined temperature. As is well known, the heating or cooling effect provided by the Peltier effect cell 36 depend on the direction of the electric current within the cell 36.

It should be noted here that the ferromagnetic elements 27, in addition to their ability to be inductively heated, enhance the thermal conductivity of the shape-memory material so that the support element 23 can be efficiently heated or cooled by the Peltier effect cell 36.

On FIGS. 2 to 5, the blocking device 13 is shown cooperating with a second heating device which is part of an apparatus 38 configured for attaching the blocking device 13 to the optical element 11.

The second heating device comprises an electromagnetic coil 37 of annular shape. The electromagnetic coil 37 is configured to be positioned with respect to the blocking device 13 so as to surround the portion of the blocking device 13 comprising the support element 23. In other words, the electromagnetic coil 37 and the support element 23 are coaxially arranged and generally at the same level.

The diameter of the coil 37 is here sufficient for the coil 37 to surround both the support element 23 and the tubular wall 24.

The electromagnetic coil 37 is configured for generating an electrical current in the ferromagnetic elements 27 dispersed within the shape-memory material so as to cause a heating effect within the support element 23.

The electromagnetic coil 37 is configured for heating the support element 23 above the predetermined temperature.

The electromagnetic coil 37 and the ferromagnetic elements 27, which are integrated to the blocking device 13, form together a heating system which is partially integrated to the blocking device 13.

At the beginning of the attachment process of the blocking device 13 to the optical element 11, the blocking device 13 is provided in its initial state where the support element 23 is at a temperature of about 20° C., which is below the predetermined temperature, the material of the support element 23 therefore being in the rigid state.

During a heating step of the attachment process, the support element 23 is heated so as to reach a temperature of about 55° C., which is above the predetermined temperature (the glass transition temperature of the material is here about 35° C.), the material of the support element 23 therefore reaching the plastic state.

The support element is here heated above the predetermined temperature by about 20° C.

More generally, the support element should be heated above the predetermined temperature by about 20 to 30° C. for the material to show an optimal plastic state and optimal adhesive properties.

Therefore, because the predetermined temperature is generally between 10 and 50° C., the support element should be heated so as to reach a temperature between 30 and 80° C.

The apparatus 38 configured for attaching the blocking device 13 to the optical element 11 will now be further described with reference to FIGS. 3 to 5.

The apparatus 38 is configured for attaching in the predetermined relative position the blocking device 13 and the semi-finished optical element 11.

The apparatus 38 includes accordingly a holder 39 configured for holding the optical element 11 and a holder 40 configured for holding the blocking device 13.

In the apparatus 38, the holder 40 is mechanically connected to a reference frame 41 as shown schematically on FIG. 3 by a dashed line. The holder 39 is also mechanically connected to the reference frame 41, as shown schematically on FIG. 3 by a dashed line.

The mechanical connection between the holder 40 and the reference frame 41 is such that the position of the holder 40 with respect to the reference frame 41 is determinable. Since the holder 40 and the blocking device 13 are configured such that when the blocking device 13 is held by the holder 40, the blocking device 13 is positioned in a predetermined manner relative to the holder 40, the position of the blocking device 13 relative to the reference frame 41 is determinable. In particular, the position of the transversal surface 25 with respect to the reference frame 41 is determinable.

The mechanical connection between the holder 39 and the reference frame 41 is such that the position of the holder 39 with respect to the reference frame 41 is determinable.

The mechanical connection between the holder 39 and the reference frame 41 includes a driving system 42 for driving the holder 39 with respect to the reference frame 41.

For determining the current position of the optical element 11 held by the holder 39 with respect to the reference frame 41, the apparatus 38 includes a camera 43.

The driving system 42 and the camera 43 are each connected to a control unit 44.

The driving system 42, the camera 43 and the control unit 44 are included in a positioning system 45 configured for positioning the semi-finished optical element 11 with respect to the reference frame 41.

The camera 43 is configured to capture images of the first face 14 of the optical element 11.

The control unit 44 is configured for detecting on the captured images the reference mark 19 and for determining the current position of the reference mark 19 with respect to the reference frame 41.

Since the position of the blocking device 13 with respect to the reference frame 41 is determinable, the control unit 44 can determine the current position of the reference mark 19 with respect to the blocking device 13.

The control unit 44 is configured for controlling the driving system 42 so as to position the optical element 11 and the blocking device 13 in the predetermined relative position.

It should be noted here that in this predetermined relative position, the transversal surface 25 of the blocking device 13 is aligned with the reference mark 19.

In a step of the attachment process illustrated on FIG. 3 the optical element 11 is mounted onto the holder 39 and the blocking device 13 is mounted onto the holder 40.

The heating step of the support element 23 described above is then performed, here while the blocking device 13 is mounted on the holder 40.

The control unit 44 determines the current position of the optical element 11, and more precisely of the reference mark 19, and drives the optical element 11 towards a starting position of the optical element 11 with respect to the blocking device 13 in which the optical element 11 is at a distance from the molding device 13 and the reference mark 19 is aligned with the transversal surface 25 of the blocking device 13.

The control unit 44 is further configured for controlling the driving system 42 so as to drive the optical element 11 from the starting position towards the predetermined relative position with respect to the blocking device 13 by bringing closer to one another the optical element 11 and the blocking device 13.

The control unit 44 is further configured for bringing the first face 14 of the semi-finished optical element 11 into contact with the transversal surface 25 of the support element 23 and for pushing the semi-finished optical element 11 against the transversal surface 25 to conform the support element 23 until the transversal surface 25 replicates the shape of the portion of the first face 14 which is in contact with the transversal surface 25 and until the semi-finished optical element 11 is in the predetermined relative position with respect to the blocking device 13.

The blocking device 13 and optical element 11 then reach the predetermined relative position, as illustrated on FIG. 4.

It should be noted that during the movement of the optical element 11 towards the blocking device 13, the first optical face 14 first comes into contact with the front edge 29 of the resiliently deformable tubular wall 24 which is then axially compressed. The front edge 29 is then biased towards the first face 14 and remains automatically in contact with this first face 14.

The first optical face 14 then comes into contact with the transversal surface 25 of the support element 23 and exerts a compression force on the latter.

Since the lateral surface 26 is free and at a distance from the tubular wall 24, the support element 23 can extend radially to accommodate the axial deformation due to the force exerted by the optical element 11.

It should also be noted that the first optical face 14 is here in direct contact with the transversal surface 25 of the support element 23 but if needed the first face 14 could be coated with a functional element such as a protection tape.

Here, the electromagnetic coil 37 is left in position and actuated during the conformation of the support element 23. The coil 37 is disabled when the blocking device 13 and optical element 11 reach the predetermined relative position.

The Peltier effect cell 36 is then actuated for cooling the support element 23 until the shape-memory material reaches a temperature of about 20° C., which is below the predetermined temperature. The material of the support element 23 therefore is on the rigid state.

During this cooling step, the blocking device 13 and the optical element 11 are maintained in the predetermined relative position by the driving system 42. The driving system 42 accordingly holds exerting a pressure onto the optical element 11 for counteracting the natural tendency of the support element 23 to recover his predetermined memory shape.

In the predetermined relative position, the first optical face 14 of the optical element 11 is in contact with the front edge 29 of the tubular wall 24 and with the transversal surface 25 of the support element 23 so as to close the annular cavity 30.

As explained above, the front edge 29 is further in sealing contact with the first optical face 14 so that the cavity 30 is closed in a sealing manner.

The apparatus 38 further comprises a vacuum pulling device which comprises here a vacuum pump 46 configured for being connected to the duct 32, here via a conduit in which is disposed the valve 33 (FIG. 5).

The duct 32 therefore forms a fluidic communication between the cavity 30 and the vacuum pump 46 which can therefore suck the air contained in the cavity 30 through the fluidic communication.

The tubular wall 24, the duct 32, the valve 33 and the cavity 30 form here a pneumatic blocking member of the blocking portion 21 of the blocking device 13. As explained below, the pneumatic blocking member is configured to sustain a vacuum inside the cavity 30 when it is closed by the first face 14 of the semi-finished optical element 11 so as to attach the semi-finished optical element 11 to the blocking portion 21 of the blocking device 13.

After the cooling step, the Peltier effect cell 36 is disabled and the vacuum pump 46 is connected to the duct 32.

A vacuum is then pulled inside the cavity 30 through the duct 32 so as to generate a vacuum-based retaining effect on the first face 14 of the optical element 11 and rigidly attach the blocking device 13 to the optical element 11.

The valve 33 is then actuated in order to prevent the fluidic communication through the duct 32 so that the vacuum is sustained inside the cavity 30.

The vacuum pump 46 can then be disconnected from the duct 32.

During the vacuum pulling step, the blocking device 13 and the optical element 11 are maintained in the predetermined relative position by the driving system 42 so as to avoid any undesirable displacement of the optical element 11 with respect to the blocking device 13.

Once the blocking device 13 maintains the optical element 11, the latter can be released from the holder 39.

The electromagnetic coil 37 can then be removed. The diameter of the electromagnetic coil 37 is accordingly greater than the diameter of the optical element 11 so that the latter can pass through.

The blocking device 13 coupled to the optical element 11 can then be released from the holder 40 and mounted onto the holder 17 of the surfacing machine 10 for processing the semi-finished optical element 11 (FIG. 1).

The support element 23 is here in contact with the optical element 11 through a central portion 47 of the first face 14 (FIG. 5).

It is thus to the shape of this central portion 47 that the transversal surface 25 of the support element 23 conforms.

Further, the rigid support provided by the support element 23 is given to the optical element 11 through this central portion 47. The rigid support is here continuously distributed over the central portion 47 of the first face 14.

The first face 14 further has a peripheral portion 48 which extends radially from the central portion 47 until the lateral face 16 of the optical element 11.

The peripheral portion 48 is at least partially in line with the annular cavity 30. The vacuum-based retaining effect therefore applies to the peripheral portion 48.

For uncoupling the optical element 11 and the blocking device 13, the valve 33 is actuated in order to enable the fluidic communication through the duct 32 so as to break the vacuum inside the cavity 30 and disable the vacuum-based retaining effect.

The blocking device 13 is then brought back to its initial state by re-heating the support element 23 above the predetermined temperature so that the shape-memory material reaches the plastic state and the support element 23 automatically assumes its predetermined memory shape, as previously explained with reference to FIG. 2.

A variant of the blocking device 113 will now be described with reference to FIGS. 6 and 7, the reference numbers pointing on similar element being increased by 100.

Figure 6:
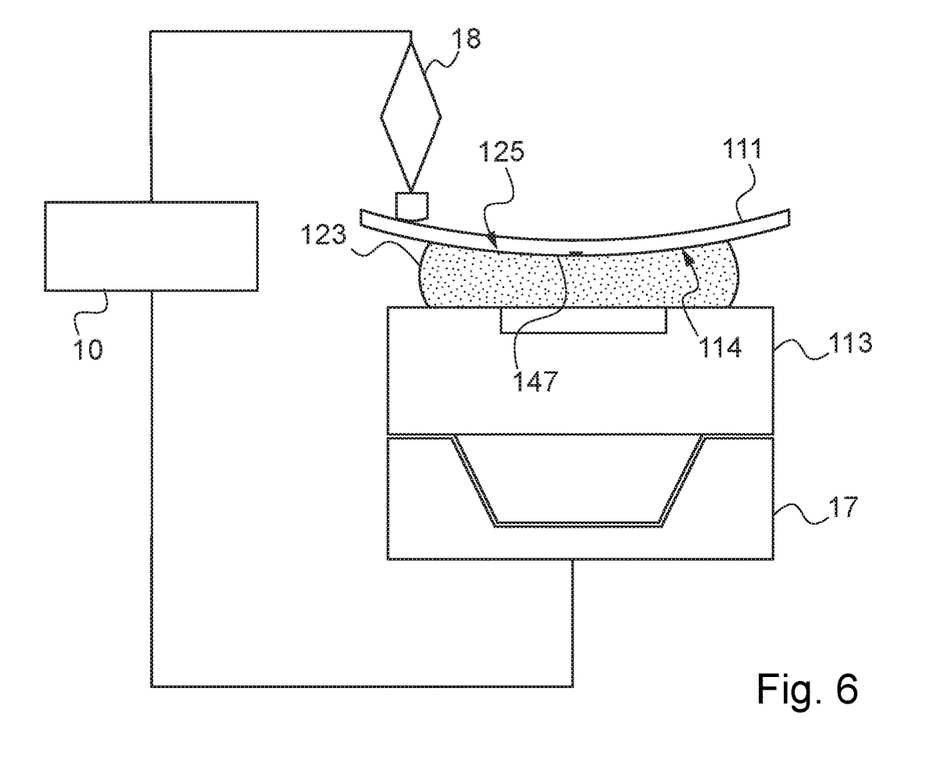
FIGS. 6 and 7 are views similar to FIGS. 1 and 2 respectively, illustrating a variant of the blocking device.
Figure 7:
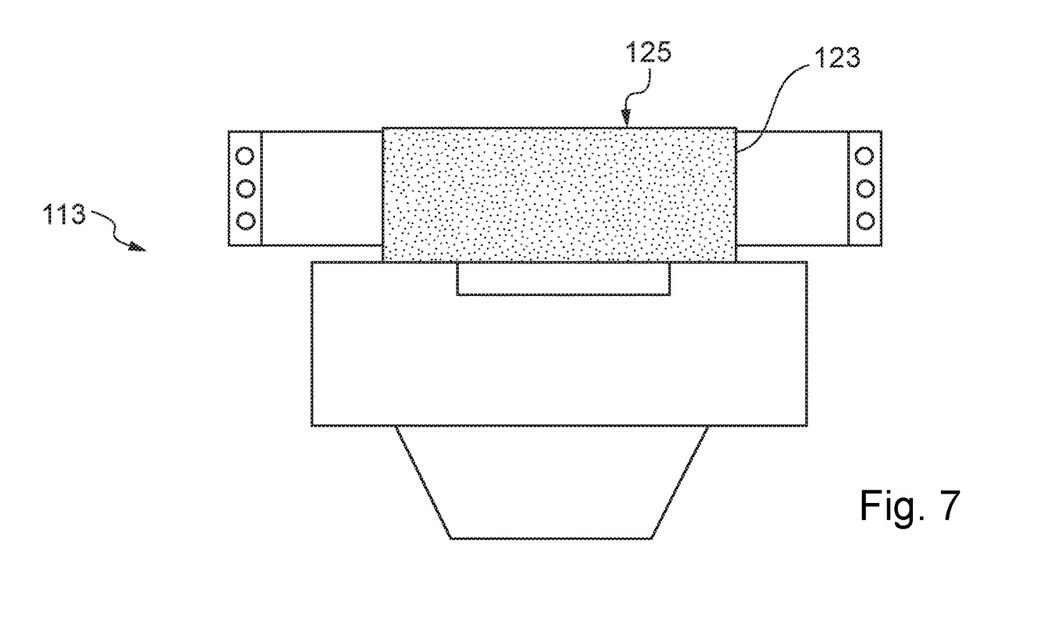

The blocking device 113 illustrated on FIGS. 6 and 7 is here deprived of the pneumatic blocking member and is configured for adhesively blocking a semi-finished optical element 111.

The shape memory material forming the support element 123 is accordingly of a different nature.

More precisely, compared with the shape-memory material previously described, this shape-memory material is further configured for having adherence properties with respect to the first face 114 of the semi-finished optical element 111 when the transversal surface 125 of the support element 123 and the first face 114 of the semi-finished optical element 111 are in direct contact with each other.

The adherence properties are in particular sufficient for attaching the first face 114 of the semi-finished optical element 111 to the transversal surface 125 of the support element 123 so that the semi-finished optical element 111 can be surfaced in the surfacing machine 10.

The adherence properties provide, between the first face 114 of the optical element 111 and the transversal surface 125 of the support element 123, an adhesion force in traction between 0.5 and 5 MPa.

The nature of the material of the optical element 111 and the nature of the shape-memory material should be selected so as to provide the desired adherence properties.

As already mentioned, the material of the optical element 111 is here polycarbonate.

As already mentioned, the material of the support element 123 comprises here a shape-memory polymer. The shape-memory material is configured so that the adherence properties appear when the shape-memory material is heated above the glass transition temperature.

In other words, the shape-memory material shows the adherence properties in the plastic state.

The shape-memory material is further configured so that the adherence properties remain between the optical element 11 and the support element 23 when the optical element 11 has been brought into direct contact with the support element 23, the shape-memory material being above the predetermined temperature, and the shape-memory material has then been cooled back below the predetermined temperature.

In other words, the adherence properties remain between the optical element 11 and the support element 23 when the shape-memory material is brought back to the rigid state.

Thanks to the adherence properties of the shape-memory material, the optical element 111 can be directly applied onto the support member for attaching the optical element 111 to the blocking device 113.

The use of an adhesive agent, for example glue or resin, or the integration of a retaining mechanism to the blocking device 113, for example a vacuum generator, is therefore avoided.

The attachment process of the blocking device 113 to the optical element 111 is similar to the attachment process of the blocking device 13 to the optical element 11 previously described.

After the cooling step, the adherence properties are sufficient so as to generate an adhesive effect on the first face 114 of the optical element 111 and rigidly attach the blocking device 113 to the optical element 111.

Here, the adhesive effect applies to the central portion 147 of the first face 114 of the optical element 111, and the rigid support provided by the support element 123 is given to the optical element 111 through the central portion 147.

In other words, the blocking device 113 is configured for providing a rigid support and an adhesive effect to the optical element 111 both through a central portion of the optical element 111.

For uncoupling the optical element 111 and the blocking device 113, the support element 123 is heated above the predetermined temperature. The optical element 111 can then be released from the blocking device 113 without damage.

More precisely, when heated the support element 123 naturally tends to recover its predetermined memory shape. The transversal surface 125 therefore tends to recover a planar shape while the first face 114 of the optical element 111 is convex. The return of the support element 123 back to its predetermined memory shape therefore contributes to automatically release the optical element 111 from the blocking device 113.

Here, the force exerted by the support element 123 recovering its predetermined memory shape overcomes the adherence properties so that the optical element 111 separates from the support element 123.

In variant, if the force is not sufficient to overcome the adherence properties, a mechanical separation of the optical element 111 and support element 123 is performed.

In variants that are not illustrated:
- the blocking device is different from a vacuum blocking device and from an adhesive blocking device, and is for example configured to generate a magnetic retaining effect;
- the blocking device is different from a vacuum blocking device and from an adhesive blocking device and comprises a element lining the transversal surface of the support element and forming the contact face of the support member;
- the support element is not secured to the body but is rather integral with the body, both the support element and the body being made of a shape memory material;
- the support member comprises more than one support element made of a shape-memory material, for example two, three or more separate support elements each forming a portion of the contact face;
- the cavity further comprises radial portions extending from the annular portion into the support element, said radial portions opening through the transversal surface of the support element;
- the bellows gasket of the resiliently deformable tubular wall is replaced, for example, by a silicon sealing ring;
- in the initial state of the blocking device the transversal surface is not flat but is rather concave or convex;
- the material of the optical element is different from a polycarbonate and is for example an organic material or a mineral material;
- the shape-memory material is a mixture of polymers of different natures;

the predetermined temperature is different from the glass transition temperature of the material and is for example the melting temperature of the material;

the apparatus for attaching the blocking device to the optical element is integrated in the surfacing machine which comprises a single holder configured for holding the blocking device during the attachment process and during the surfacing operation;

the first cooling and/or heating device is different from a Peltier effect cell and comprises for example a resistive heater and/or a circuit in which flows a refrigerant fluid;

the first cooling and/or heating device comprises more than one Peltier effect cell, for example a first cell dedicated to cooling and a second cell dedicated to heating, or more than two cells;

the second heating device is different from an electromagnetic coil and the shape-memory material is devoid of ferromagnetic elements, the second heating device comprising for example an infra-red radiating device;

the step of heating the support element is performed by the Peltier effect cell; and/or the electromagnetic coil is removed before conforming the support element.

It should be noted more generally that the invention is not limited to the examples described and represented.

The invention claimed is:

1. A blocking device for blocking a semi-finished optical element (11; 111) having a first face (14; 114) to which the blocking device (13; 113) is to be attached and having opposite to the first face (14; 114) a second face (15) to be surfaced in a surfacing machine (10) configured for holding the semi-finished optical element (11; 111) via the blocking device (13; 113), said blocking device (13; 113) comprising:

a mounting portion (20) provided for mounting the blocking device (13; 113) on a corresponding mounting member (17) of said surfacing machine (10) ; and a blocking portion (21) configured for blocking said semi-finished optical element (11; 111) ;

said blocking portion (21) comprising a support member configured for providing a rigid support to said semi-finished optical element (11; 111), wherein said support member includes a support element (23; 123) made of a shape-memory material comprising ferromagnetic elements (27), said support element having a rigid state below a predetermined temperature and a plastic state above said predetermined temperature, said support element (23; 123) assuming in the absence of external forces a predetermined memory shape when heated above said predetermined temperature, said support member having a contact face (25; 125) onto which said first face (14; 114) of said semi-finished optical element (11; 111) is to be applied;

wherein said blocking portion (21) includes a heating device (36) configured for heating said support element above said predetermined temperature, wherein said ferromagnetic elements (27) configure said support element (23; 123) for being inductively heated above said predetermined temperature by the heating element (36), wherein the blocking device is further configured to generate a magnetic retaining effect.

2. The blocking device according to claim 1, further comprising a cooling device (36) configured for cooling said support element below said predetermined temperature, wherein said heating device and/or said cooling device comprises a Peltier effect cell (36).

3. The blocking device according to claim 2, further comprising a body (22) forming said mounting portion (20), said support element (23; 123) projecting from said body (22); said Peltier effect cell (36) is integrated into a portion of said body (22) located at a side of the support element (23; 123) opposite to said contact face (25; 125).

4. The blocking device according to claim 1, wherein said ferromagnetic elements (27) are in the form of a powder dispersed into said material.

5. The blocking device according to claim 1, wherein said ferromagnetic elements (27) represent a volume ratio between 10 and 40%.

6. The blocking device according to claim 1, wherein said predetermined temperature is between 10 and 50° C.

7. The blocking device according to claim 1, wherein said material has a Young modulus between 5 and 100 MPa below said predetermined temperature, and between 0,3 and 3 MPa above said predetermined temperature.

8. The blocking device according to claim 1, further comprising a blocking member configured for enabling a vacuum-based retaining effect so that said semi-finished optical element (11) is attached to said blocking portion (21), said contact face of said support member being a surface (25) of said support element (23).

9. The blocking device according to claim 8, further comprising a pneumatic blocking member defining a cavity (30) configured to be closed by said first face (14) of said semi-finished optical element (11), said pneumatic blocking member being configured to sustain a vacuum inside said cavity (30) when closed by said first face (14) of said semi-finished optical element (11) so as to enable said vacuum-based retaining effect.

10. The blocking device according to claim 1, wherein said contact face of said support member is a surface (125) of said support element (123) and said shape-memory material is configured for having adherence properties with respect to said first face (114) of said semi-finished optical element (111) when said contact face of said support element (123) and said first face (114) of said semi-finished optical element (111) are in direct contact with each other, said adherence properties being sufficient for attaching said first face (114) of said semi-finished optical element (111) to said contact face of said support element (123) so that the semi-finished optical element (111) can be surfaced in the surfacing machine (10).

11. An apparatus for attaching in a predetermined relative position a blocking device (13; 113) according to claim 1 and a semi-finished optical element (11; 111) having a first face (14; 114) to which the blocking device (13; 113) is to be attached and having opposite to the first face (14; 114) a second face (15) to be surfaced in a surfacing machine (10) configured for holding the semi-finished optical element (11; 111) via the blocking device (13; 113), said apparatus (38) comprising a positioning system (45) configured to determine a current position of said semi-finished optical element (11; 111) with respect to a reference frame (41) of said apparatus (38), and configured for positioning said semi-finished optical element (11; 111) with respect to said reference frame (41) into said predetermined relative position.

12. The apparatus according to claim 11, wherein said heating device comprises an electromagnetic coil (37) such that said support element (23; 123) is configured for being inductively heated by said electromagnetic coil (37) above said predetermined temperature.

13. A method for attaching in a predetermined relative position a blocking device (13; 113) according to claim 2 and a semi-finished optical element (11; 111) having a first face (14; 114) to which the blocking device (13; 113) is to be attached and having opposite to the first face (14; 114) a second face (15) to be surfaced in a surfacing machine (10) configured for holding the semi-finished optical element (11; 111) via the blocking device (13; 113), said method comprising the steps of:

providing said blocking device (13; 113) in an initial state in which said material of said support element (23; 123) is in said rigid state and said support element (23; 123) assumes said memory shape;

then heating said support element (23; 123) above said predetermined temperature so that said material reaches said plastic state;

then bringing said first face (14; 114) of said semi-finished optical element (11; 111) into contact with said contact face (25; 125) of said support element (23; 123) and pushing said semi-finished optical element (11; 111) against said contact face (25; 125) to conform said support element (23; 123) until said contact face (25; 125) replicates the shape of the portion of said first face (14; 114) which is in contact with said contact face (25; 125) and said semi-finished optical element (11; 111) is in said predetermined relative position with respect to said blocking device (13; 113); and     then cooling said support element (23; 123) below said predetermined temperature so that said material reaches said rigid state.

14. The method according to claim 13, wherein for reaching said plastic state of said material said support element (23; 123) is heated at a temperature of about 55° C., and for reaching said rigid state of said material said support element (23; 123) is cooled at a temperature of about 20° C.

15. The blocking device according to claim 4, wherein said ferromagnetic elements (27) represent a volume ratio between 10 and 40%.

16. The blocking device according to claim 1, further comprising a body (22) forming said mounting portion (20), a resiliently deformable tubular wall (24) attached to the body (22) and extending around the support element (23).

17. The blocking device of claim 16, wherein the tubular wall (24) comprises a bellows gasket having a rear edge (28) fixed to the body (22) and a front edge (29), opposite to the rear edge (28), wherein the front edge (29) is configured to be in sealing contact with the first optical face (14) of the optical element (11) when the optical element (11) is attached to the blocking device (13).

18. The blocking device of claim 16, a portion of an internal space (31) extending between a lateral surface (26) of the support element (23) and the tubular wall (24) forms a cavity (30) which extends around the support element (23).

19. The blocking device of claim 16, further comprising a duct (32) formed in the body (22) and a valve (33) connected to the duct (32), wherein the duct (32) is connected through a first end (34) to the valve (33), the duct (32) opening into the cavity (30) through an opposite end (35) to the first end (34).

\* \* \* \* \*